United States Patent
Schiebeck

(10) Patent No.: US 9,199,532 B2
(45) Date of Patent: Dec. 1, 2015

(54) VEHICLE EXHAUST ASSEMBLY

(71) Applicant: Oscar F. Schiebeck, Camarillo, CA (US)

(72) Inventor: Oscar F. Schiebeck, Camarillo, CA (US)

(*) Notice: Subject to any disclaimer, the term of this patent is extended or adjusted under 35 U.S.C. 154(b) by 0 days.

(21) Appl. No.: 14/243,072

(22) Filed: Apr. 2, 2014

(65) Prior Publication Data

US 2015/0283897 A1    Oct. 8, 2015

(51) Int. Cl.
*F01N 1/02* (2006.01)
*B60K 13/04* (2006.01)

(52) U.S. Cl.
CPC .. *B60K 13/04* (2013.01); *F01N 1/02* (2013.01)

(58) Field of Classification Search
CPC ............................................. F01N 1/163
USPC .................. 181/246, 237, 241, 254, 271, 277
See application file for complete search history.

(56) References Cited

U.S. PATENT DOCUMENTS

| | | | |
|---|---|---|---|
| 3,346,071 A * | 10/1967 | Lader ............................ | 181/236 |
| 4,541,506 A * | 9/1985 | Venning et al. ............... | 181/254 |
| 4,609,068 A * | 9/1986 | Backlund ...................... | 181/226 |
| 5,355,673 A * | 10/1994 | Sterling et al. ................ | 60/324 |
| 6,367,580 B1 | 4/2002 | Chang | |
| 6,520,285 B2 | 2/2003 | Tobias | |
| 6,637,545 B1 * | 10/2003 | Jonsson et al. ............... | 181/237 |
| 6,810,992 B1 | 11/2004 | Lombardo | |
| 8,384,528 B2 | 2/2013 | McCarthy et al. | |
| 2003/0121720 A1 * | 7/2003 | Chang ........................... | 181/254 |
| 2005/0067219 A1 * | 3/2005 | Albertson et al. ............. | 181/240 |
| 2008/0023264 A1 * | 1/2008 | Pacini et al. .................. | 181/237 |
| 2008/0121458 A1 | 5/2008 | Sturgis | |
| 2008/0245605 A1 | 10/2008 | Maeda et al. | |
| 2011/0127105 A1 | 6/2011 | Lim et al. | |
| 2013/0142352 A1 | 6/2013 | Koch et al. | |

FOREIGN PATENT DOCUMENTS

GB           191001904 A       1/1911

* cited by examiner

*Primary Examiner* — Jeremy Luks

(57) ABSTRACT

A vehicle exhaust assembly for modifying a sound of the vehicle exhaust includes a housing that is operationally coupled to a vehicle exhaust pipe on a vehicle. The vehicle exhaust is directed into the housing. A baffle is coupled to the housing. A flow of the vehicle exhaust passes over the baffle. The baffle has a plurality of exhaust apertures extending therethrough. The flow of the vehicle exhaust passes through the plurality of exhaust apertures. The plurality of exhaust apertures alters a resonant frequency of the flow of the vehicle exhaust. An audible sound of the flow vehicle exhaust is modified. A knob is operationally coupled to the housing. The knob is operationally coupled to the baffle so the knob moves the baffle. A user selectively moves the knob so baffle is positioned at a selected angle with respect to the flow of the vehicle exhaust. The audible sound of the flow of the vehicle sound is adjusted between a minimum and a maximum resonant frequency.

13 Claims, 3 Drawing Sheets

VEHICLE EXHAUST ASSEMBLY

BACKGROUND OF THE DISCLOSURE

Field of the Disclosure

The disclosure relates to vehicle exhaust devices and more particularly pertains to a new vehicle exhaust device for modifying a sound of the vehicle exhaust.

SUMMARY OF THE DISCLOSURE

An embodiment of the disclosure meets the needs presented above by generally comprising a housing that is operationally coupled to a vehicle exhaust pipe on a vehicle. The vehicle exhaust is directed into the housing. A baffle is coupled to the housing. A flow of the vehicle exhaust passes over the baffle. The baffle has a plurality of exhaust apertures extending therethrough. The flow of the vehicle exhaust passes through the plurality of exhaust apertures. The plurality of exhaust apertures alters a resonant frequency of the flow of the vehicle exhaust. An audible sound of the flow vehicle exhaust is modified. A knob is operationally coupled to the housing. The knob is operationally coupled to the baffle so the knob moves the baffle. A user selectively moves the knob so baffle is positioned at a selected angle with respect to the flow of the vehicle exhaust. The audible sound of the flow of the vehicle sound is adjusted between a minimum and a maximum resonant frequency.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
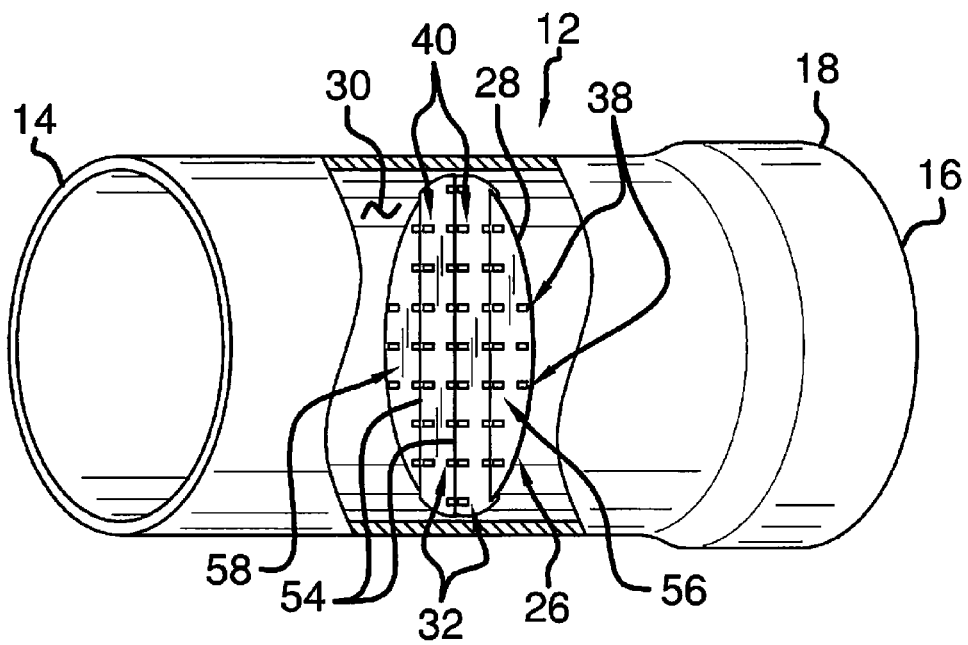
FIG. 1 is a top cut away view of a vehicle exhaust assembly according to an embodiment of the disclosure.
Figure 2:
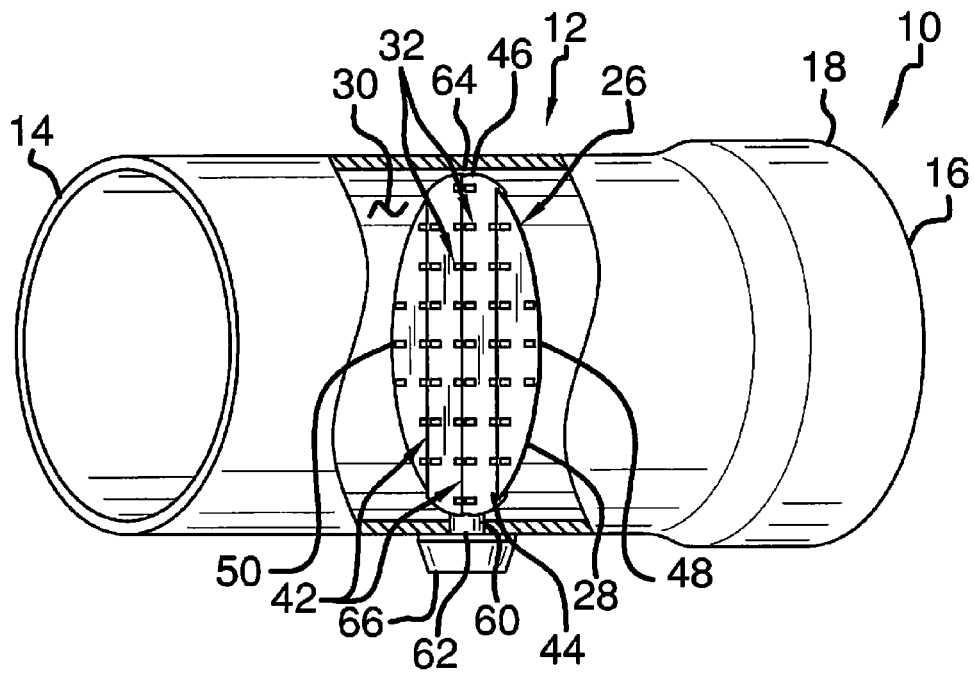
FIG. 2 is a top view of an embodiment of the disclosure.
Figure 3:
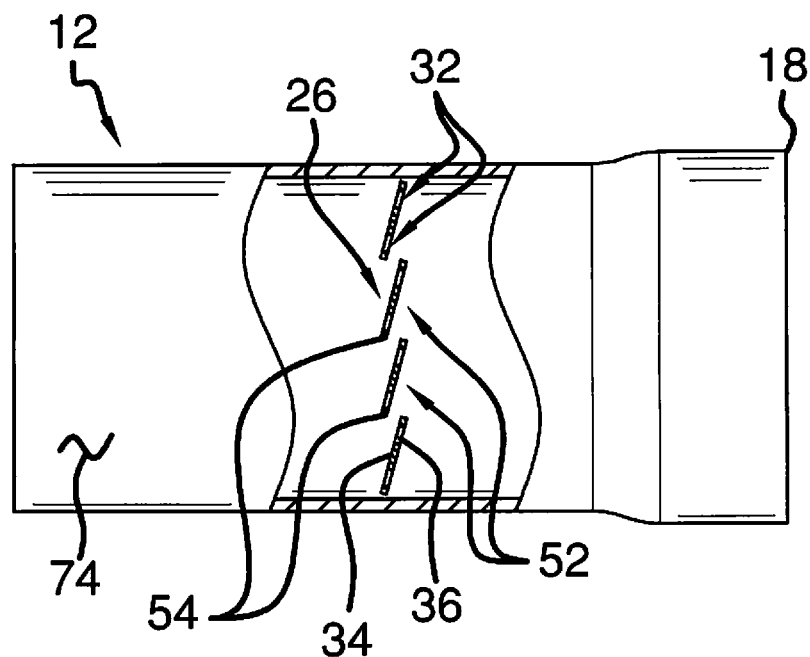
FIG. 3 is a right side cut away view of an embodiment of the disclosure.
Figure 4:
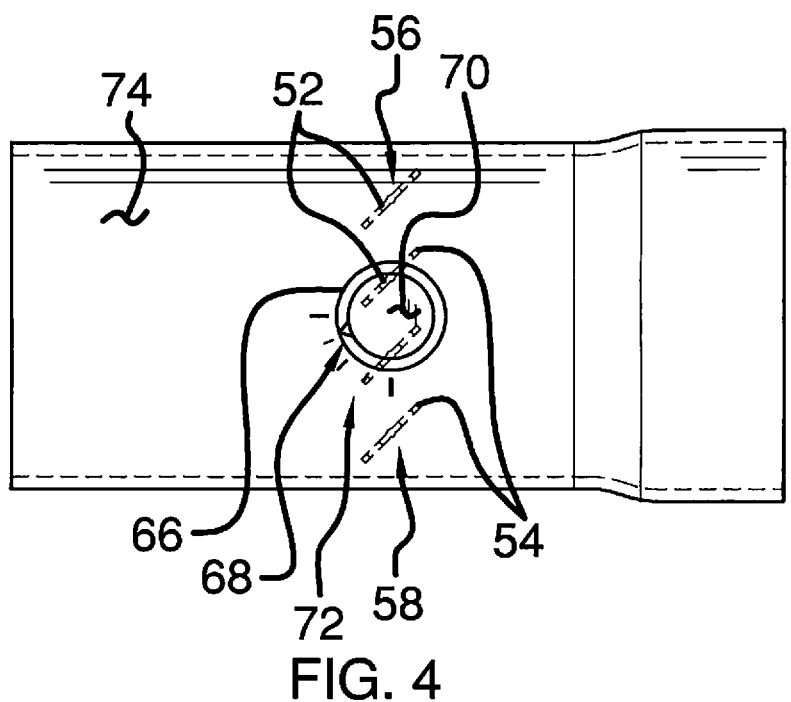
FIG. 4 is a right side view of an embodiment of the disclosure.
Figure 5:
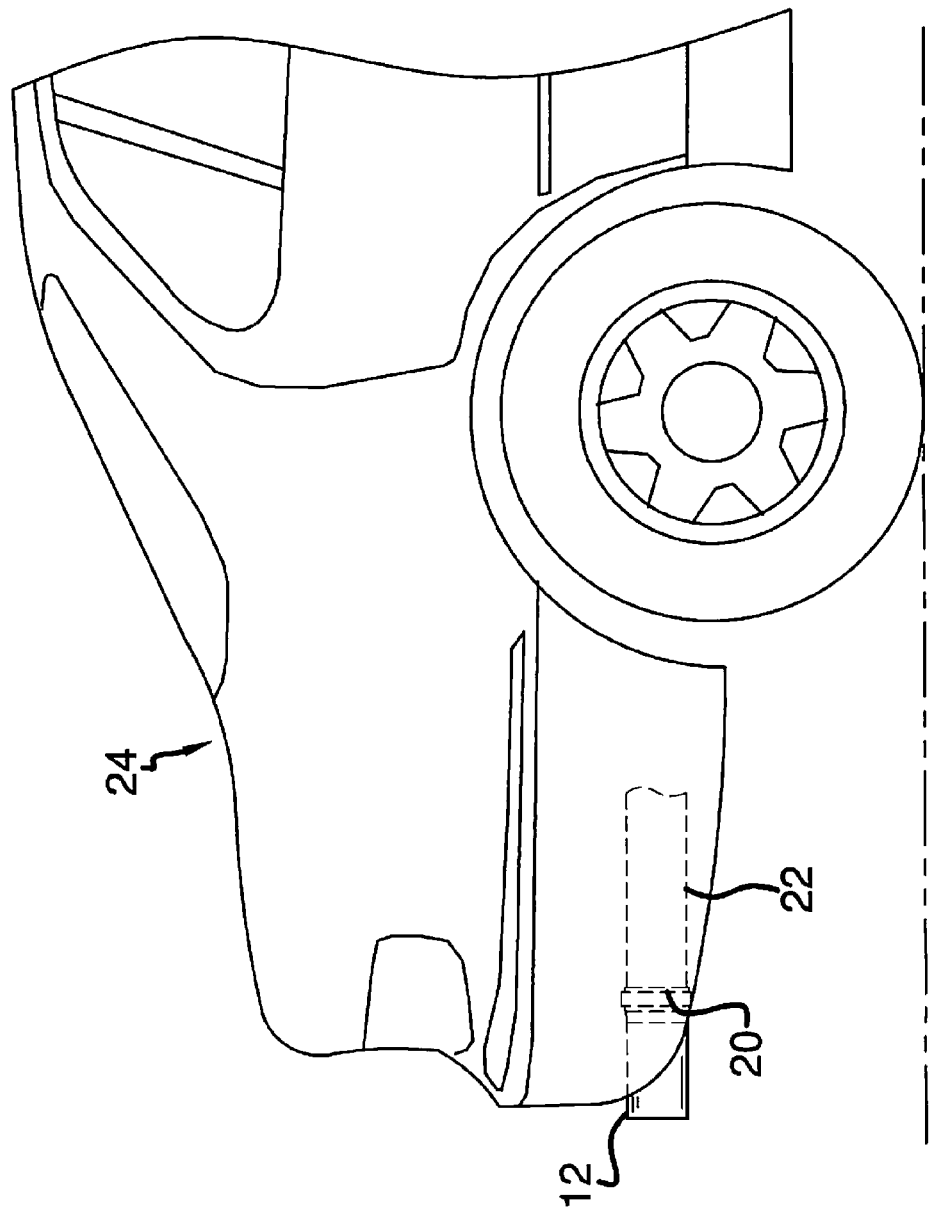
FIG. 5 is an in-use view of an embodiment of the disclosure.

With reference now to the drawings, and in particular to FIGS. 1 through 5 thereof, a new vehicle exhaust device embodying the principles and concepts of an embodiment of the disclosure and generally designated by the reference numeral 10 will be described.

As best illustrated in FIGS. 1 through 5, the vehicle exhaust assembly 10 generally comprises a housing 12 that has a first end 14 and a second end 16. Each of the first 14 and second 16 ends of the housing 12 is open. The housing 12 is elongated between the first 14 and second 16 ends. An outer wall 18 of the housing 12 is curvilinear so the housing 12 has a tubular shape. The housing 12 may have a length between 10 cm and 15 cm.

The outer wall 18 of the housing 12 flares outwardly proximate the second end 16 of the housing 12. The second end 16 of the housing 12 has a diameter that is greater than a diameter of the first end 14 of the housing 12. The second end 16 of the housing 12 insertably receives a free end 20 of a vehicle exhaust pipe 22. The housing 12 is fluidly coupled to the vehicle exhaust pipe 22 so the vehicle exhaust is directed into the housing 12. Finally, the vehicle 24 may be a passenger vehicle of any conventional design.

A baffle 26 is provided. An outer edge 28 of the baffle 26 is curved so the baffle 26 has a circular shape. The baffle 26 is positioned within an interior of the housing 12. The outer edge 28 of the baffle 26 is coextensive with an inside surface 30 of the outer wall 18 of the housing 12. A flow of the vehicle exhaust passes over the baffle 26. The baffle 26 may be comprised of a rigid material such as steel or other similar material.

The baffle 26 has a plurality of exhaust apertures 32 extending through a front surface 34 and a back surface 36 of the baffle 26. The plurality of exhaust apertures 32 each has a length that is greater than a width of the plurality of exhaust apertures 32. Each of the plurality of exhaust apertures 32 has a rectangular shape. The flow of the vehicle exhaust passes through the plurality of exhaust apertures 32 so the vehicle exhaust generates a selected pitch of an audible sound.

The plurality of exhaust apertures 32 alters a resonant frequency of the flow of the vehicle exhaust. The audible sound of the flow vehicle exhaust is modifiable between a minimum and a maximum pitch. The plurality of exhaust apertures 32 is evenly distributed on the baffle 26. Moreover, the plurality of exhaust apertures 32 is arranged in a plurality of columns 38 and rows 40.

The baffle 26 has a plurality of cuts 42 extending between a first lateral side 44 and a second lateral side 46 of the baffle 26. The plurality of cuts 42 is evenly spaced apart and distributed between a top side 48 and a bottom side 50 of the baffle 26. The baffle 26 is divided into a plurality of sections 52. The plurality of cuts 42 each extends between an associated pair of the plurality of rows of the exhaust apertures 40. Each of the plurality of rows of the exhaust apertures 40 is positioned proximate to and is coextensive with a bounding edge 54 of each of the plurality of sections 52 of the baffle 26. Finally, each of a top one 56 and a bottom one 58 of the plurality of sections of the baffles defines a segment of a circle.

A rod 60 is provided. The rod 60 has a primary end 62 and a secondary end 64. Additionally, the rod 60 is elongated between the primary 62 and secondary 64 ends. The secondary end 64 of the rod 60 is movably coupled to the inside surface 30 of the outer wall 18 of the housing 12. The rod 60 extends laterally through the interior of the housing 12 so the primary end 62 of the rod 60 extends through the outer wall 18 of the housing 12. Each of the plurality of sections of the baffle 26 is operationally coupled to the rod 60.

A knob 66 is coupled to the primary end 62 of the rod 60. The user selectively rotates the knob 66 so the knob 66 rotates the rod 60. Each of the plurality of sections 52 of the baffle 26 is positioned at a selected angle with respect to the flow of the vehicle exhaust when the knob 66 is rotated. The audible sound of the flow of the vehicle sound is adjusted between a minimum and a maximum resonant frequency. Indicia 68 is printed on a front surface 70 of the knob 66. The indicia 68 comprise an arrow.

Indicia 72 is printed on an outer surface 74 of the outer wall 18 of the housing 12. The indicia 72 comprise a plurality of lines. Additionally, the indicia 72 are positioned proximate the knob 66. The plurality of lines indicate the selected angle of the plurality of sections 52 of the baffle 26. The knob 66 is rotated so the arrow on the knob 66 points at a selected one of the plurality of lines. The plurality of sections 52 of the baffle 26 are positioned parallel to the flow of the vehicle exhaust when the knob 66 is positioned at a minimum position. Lastly, the plurality of sections 52 of the baffle 26 are positioned perpendicular to the flow of the vehicle exhaust when the knob 66 is positioned in a maximum position.

Alternatively, the plurality of sections 52 of the baffle 26 may be coupled to the inside surface 30 of the outer wall 18 of the housing 12. The plurality of sections 52 of the baffle 26 are positioned at a fixed angle with respect to the flow of the vehicle exhaust. Additionally, the plurality of exhaust apertures 32 produces a fixed pitch of the audible sound of the vehicle exhaust. A selected fixed pitch of the audible sound is determined by the fixed angle of the plurality of sections 52 of the baffle 26.

In use, the housing 12 is coupled to the vehicle exhaust pipe 22. The knob 66 is rotated to select a desired pitch of the audible sound of the vehicle exhaust. The housing 12 is removable from the vehicle exhaust pipe 22 at any time. The plurality of sections 52 of the baffle 26 does not impact the performance of the vehicle 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle exhaust assembly for modifying a sound of the vehicle exhaust, said assembly comprising:
    a housing operationally coupled to a vehicle exhaust pipe on the vehicle such that the vehicle exhaust is directed into said housing;
    a baffle coupled to said housing such that a flow of the vehicle exhaust passes over said baffle;
    said baffle having a plurality of exhaust apertures extending therethrough such that the flow of the vehicle exhaust passes through said plurality of exhaust apertures, said plurality of exhaust apertures altering a resonant frequency of the flow of the vehicle exhaust such that an audible sound of the flow vehicle exhaust is modified, said baffle having a plurality of cuts extending between a first lateral side and a second lateral side of said baffle such that said plurality of cuts is evenly spaced apart and distributed between a top side and a bottom side of said baffle, said baffle being divided into a plurality of sections, said plurality of cuts each extending between an associated pair of a plurality of rows of said exhaust apertures such that each of said plurality of rows of said exhaust apertures is positioned proximate and being coextensive with a bounding edge of each of said plurality of sections of said baffle; and
    a knob operationally coupled to said housing, said knob being operationally coupled to said baffle such that said knob moves said baffle, a user selectively moving said knob having said baffle being positioned at a selected angle with respect to the flow of the vehicle exhaust such that the audible sound of the flow of the vehicle sound is adjusted between a minimum and a maximum resonant frequency.

2. The assembly according to claim 1, wherein said housing having a first end and a second end, each of said first and second ends of said housing being open, said housing being elongated between said first and second ends.

3. The assembly according to claim 1, wherein an outer wall of said housing being curvilinear such that said housing has a tubular shape.

4. The assembly according to claim 1, wherein an outer wall of said housing flaring outwardly proximate a second end of said housing such that said second end of said housing has a diameter being greater than a diameter of a first end of said housing.

5. The assembly according to claim 1, wherein a second end of said housing insertably receiving a free end of the vehicle exhaust pipe such that said housing is fluidly coupled to the vehicle exhaust pipe.

6. The assembly according to claim 1, wherein an outer edge of said baffle being curved such that said baffle has a circular shape, said baffle being positioned within an interior of said housing such that said outer edge of said baffle is coextensive with an inside surface of an outer wall of said housing.

7. The assembly according to claim 1, wherein said plurality of exhaust apertures extending through a front surface and a back surface of said baffle.

8. The assembly according to claim 1, wherein said plurality of exhaust apertures being evenly distributed on said baffle such that said plurality of exhaust apertures is arranged in a plurality of columns and rows.

9. The assembly according to claim 1, wherein a rod having a primary end and a secondary end, said rod being elongated between said primary and secondary ends.

10. The assembly according to claim 9, wherein said secondary end of said rod being movably coupled to an inside surface of an outer wall of said housing, said rod extending laterally through an interior of said housing such that said primary end of said rod extends through said outer wall of said housing.

11. The assembly according to claim 1, wherein each of a plurality of sections of said baffle being operationally coupled to a rod.

12. The assembly according to claim 1, wherein said knob being coupled to a primary end of a rod, the user selectively rotating said knob such that said knob rotates said rod, each of a plurality of sections of said baffle being positioned at a selected angle with respect to the flow of the vehicle exhaust.

13. A vehicle exhaust assembly for modifying a sound of the vehicle exhaust, said assembly comprising:
- a housing having a first end and a second end, each of said first and second ends of said housing being open, said housing being elongated between said first and second ends, an outer wall of said housing being curvilinear such that said housing has a tubular shape, said outer wall of said housing flaring outwardly proximate said second end of said housing such that said second end of said housing has a diameter being greater than a diameter of said first end of said housing, said second end of said housing insertably receiving a free end of a vehicle exhaust pipe such that said housing is fluidly coupled to the vehicle such that the vehicle exhaust is directed into said housing;
- a baffle, an outer edge of said baffle being curved such that said baffle has a circular shape, said baffle being positioned within an interior of said housing such that said outer edge of said baffle is coextensive with an inside surface of said outer wall of said housing, a flow of the vehicle exhaust passing over said baffle;
- said baffle having a plurality of exhaust apertures extending through a front surface and a back surface of said baffle such that the flow of the vehicle exhaust passes through said plurality of exhaust apertures, said plurality of exhaust apertures altering a resonant frequency of the flow of the vehicle exhaust such that an audible sound of the flow vehicle exhaust is modified;
- said plurality of exhaust apertures being evenly distributed on said baffle such that said plurality of exhaust apertures is arranged in a plurality of columns and rows, a knob operationally coupled to said housing;
- said baffle having a plurality of cuts extending between a first lateral side and a second lateral side of said baffle such that said plurality of cuts is evenly spaced apart and distributed between a top side and a bottom side of said baffle, said baffle being divided into a plurality of sections;
- said plurality of cuts each extending between an associated pair of said plurality of rows of said exhaust apertures such that each of said plurality of rows of said exhaust apertures is positioned proximate and being coextensive with a bounding edge of each of said plurality of sections of said baffle;
- a rod having a primary end and a secondary end, said rod being elongated between said primary and secondary ends, said secondary end of said rod being movably coupled to said inside surface of said outer wall of said housing, said rod extending laterally through said interior of said housing such that said primary end of said rod extends through said outer wall of said housing, each of said plurality of sections of said baffle being operationally coupled to a rod; and
- a knob coupled to said primary end of said rod, the user selectively rotating said knob such that said knob rotates said rod, each of said plurality of sections of said baffle being positioned at a selected angle with respect to the flow of the vehicle exhaust such that the audible sound of the flow of the vehicle sound is adjusted between a minimum and a maximum resonant frequency.

\* \* \* \* \*